(12) United States Patent
Mi et al.

(10) Patent No.: US 7,830,100 B2
(45) Date of Patent: Nov. 9, 2010

(54) SYSTEM FOR DRIVING A PLURALITY OF LAMPS

(75) Inventors: Tzu-Chiang Mi, Jhongli (TW);
Chih-Chan Ger, Jhongli (TW);
Chia-Kun Chen, Jhongli (TW);
Chi-Chang Lu, Jhongli (TW)

(73) Assignees: Ampower Technology Co., Ltd., Jhongli, Taoyuan County (TW); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/650,448

(22) Filed: Dec. 30, 2009

(65) Prior Publication Data

US 2010/0102744 A1  Apr. 29, 2010

Related U.S. Application Data

(63) Continuation-in-part of application No. 12/011,886, filed on Jan. 30, 2008, which is a continuation-in-part of application No. 11/308,745, filed on Apr. 28, 2006, now Pat. No. 7,362,103.

(30) Foreign Application Priority Data

Oct. 22, 2009  (CN)  .................. 2009 2 0313075

(51) Int. Cl.
*G05F 1/00* (2006.01)
(52) U.S. Cl. .................. 315/291; 315/224; 315/282; 315/312
(58) Field of Classification Search .............. 315/282, 315/276–278, 224, 291, 312, 324, 325, 209 R
See application file for complete search history.

(56) References Cited

U.S. PATENT DOCUMENTS

| 6,960,891 | B2 | 11/2005 | Park, II et al. | |
| 7,061,183 | B1* | 6/2006 | Ball | 315/57 |
| 7,173,382 | B2* | 2/2007 | Ball | 315/282 |
| 7,242,147 | B2* | 7/2007 | Jin | 315/177 |
| 7,294,971 | B2* | 11/2007 | Jin | 315/177 |
| 7,362,103 | B2* | 4/2008 | Ger et al. | 324/414 |
| 2006/0197466 | A1 | 9/2006 | Park | |
| 2008/0129300 | A1* | 6/2008 | Ger et al. | 324/414 |

* cited by examiner

*Primary Examiner*—Haissa Philogene
(74) *Attorney, Agent, or Firm*—Raymond J. Chew

(57) ABSTRACT

A system for driving a plurality of lamps may monitor the faults of the lamps by detecting the voltage variance of the first, second and third detecting resistors connected to the low voltage ends of the first and second secondary winding for providing the power to the lamps.

7 Claims, 15 Drawing Sheets

SYSTEM FOR DRIVING A PLURALITY OF LAMPS

CROSS-REFERENCE TO RELATED APPLICATIONS

This application is a Continuation-In-Part of U.S. application Ser. No. 12/011,886, entitled "SYSTEM FOR DRIVING A PLURALITY OF LAMPS", filed on Jan. 30, 2008, which is a Continuation-In-Part of U.S. application Ser. No. 11/308,745, entitled "SYSTEM FOR DRIVING A PLURALITY OF LAMPS AND FAULT DETECTING CIRCUIT THEREOF", filed on Apr. 28, 2006 now U.S. Pat. No. 7,362,103.

BACKGROUND

1. Technical Field

The disclosure relates to a backlight device, and particularly to a system for driving a number of lamps used in backlight modules of liquid crystal displays.

2. Description of Related Art

Discharge Lamps, especially cold cathode fluorescent lamps (CCFLs), are used as light sources for liquid crystal display (LCD) panels. Typically, the CCFLs are driven by a number of inverter circuits. An inverter circuit provides alternating current (AC) signals to the CCFLs.

Generally, the inverter circuit employed by the large-size LCD panels includes a number of outputs to respectively provide AC signals to the CCFLs. When a short-circuit or open causes a fault on any output of the inverter circuit and a corresponding CCFL fails, the LCD panel loses its luminance symmetry. Due to lack of fault detection capabilities on the inverter outputs, the backlight inverter circuit fails to provide proper protection functions when faults occur.

Therefore, it is desirable to provide a system for driving a plurality of lamps which can overcome the above-mentioned problems.

DETAILED DESCRIPTION

Figure 1:
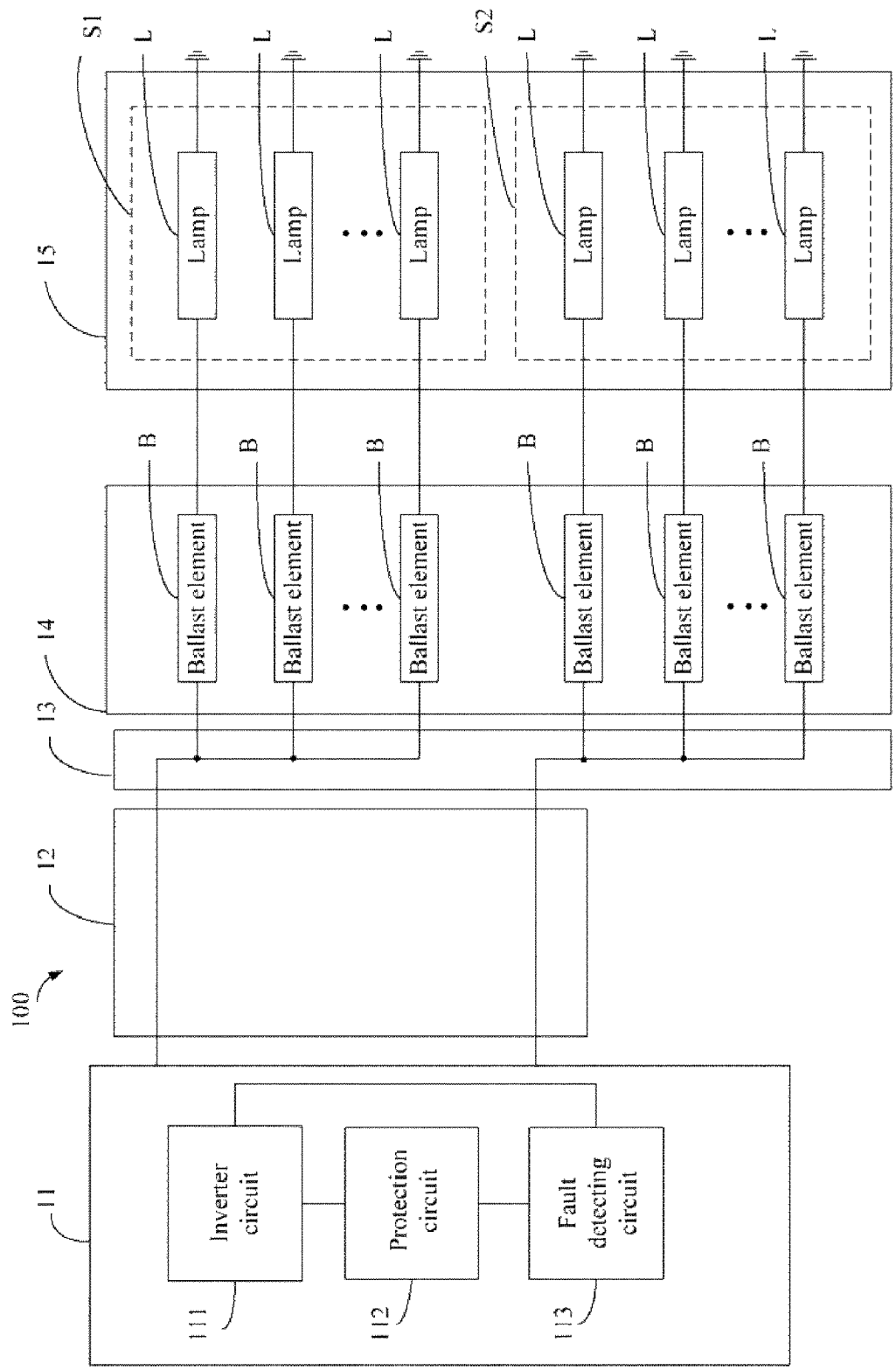
FIG. 1 is a block diagram showing an exemplary embodiment of a system for driving a plurality of lamps.

Referring to FIG. 1, a backlight assembly 100, according to an exemplary embodiment, is illustrated. The backlight assembly 100 may be utilized in a display, such as a liquid crystal display (LCD). The backlight assembly 100 includes a power supply 11, a lamps module 15, an interface 12, a splitter 13, and a balance unit 14. The power supply 11 provides power (such as AC signals) to the lamps module 15 in order through the interface 12, the splitter 13, and the balance unit 14. The lamps module 15 includes a number of lamps L that may include CCFLs or other discharge lamps. The power supply 11 includes an inverter circuit 111, a fault detecting circuit 113, and a protection circuit 112. The inverter circuit 111 generates power to drive the lamps module 15 and ensures lamps L therein constantly remain on. The fault detecting circuit 113 monitors and reports a condition of at least one of the lamps L to the protection circuit 112 by detecting signals generated by the inverter circuit 111, such that the protection circuit 112 may accordingly protect the backlight assembly 100, such as cutting off the inverter circuit 111 or triggering prompting of a warning message or an alarm.

The interface 12 may include one or more high voltage tolerable wired lines or buses for conveying power from the power supply 11 to the splitter 13. The splitter 13 receives the power provided by the inverter circuit 111 of the power supply 11 through the interface 12 and distributes the power to the number of lamps L of the lamps module 15. The balance unit 14 includes a number of ballast elements B for respectively balancing current flowing through the lamps L. Each ballast element B may include a capacitor, inductor or other components.

Figure 2:
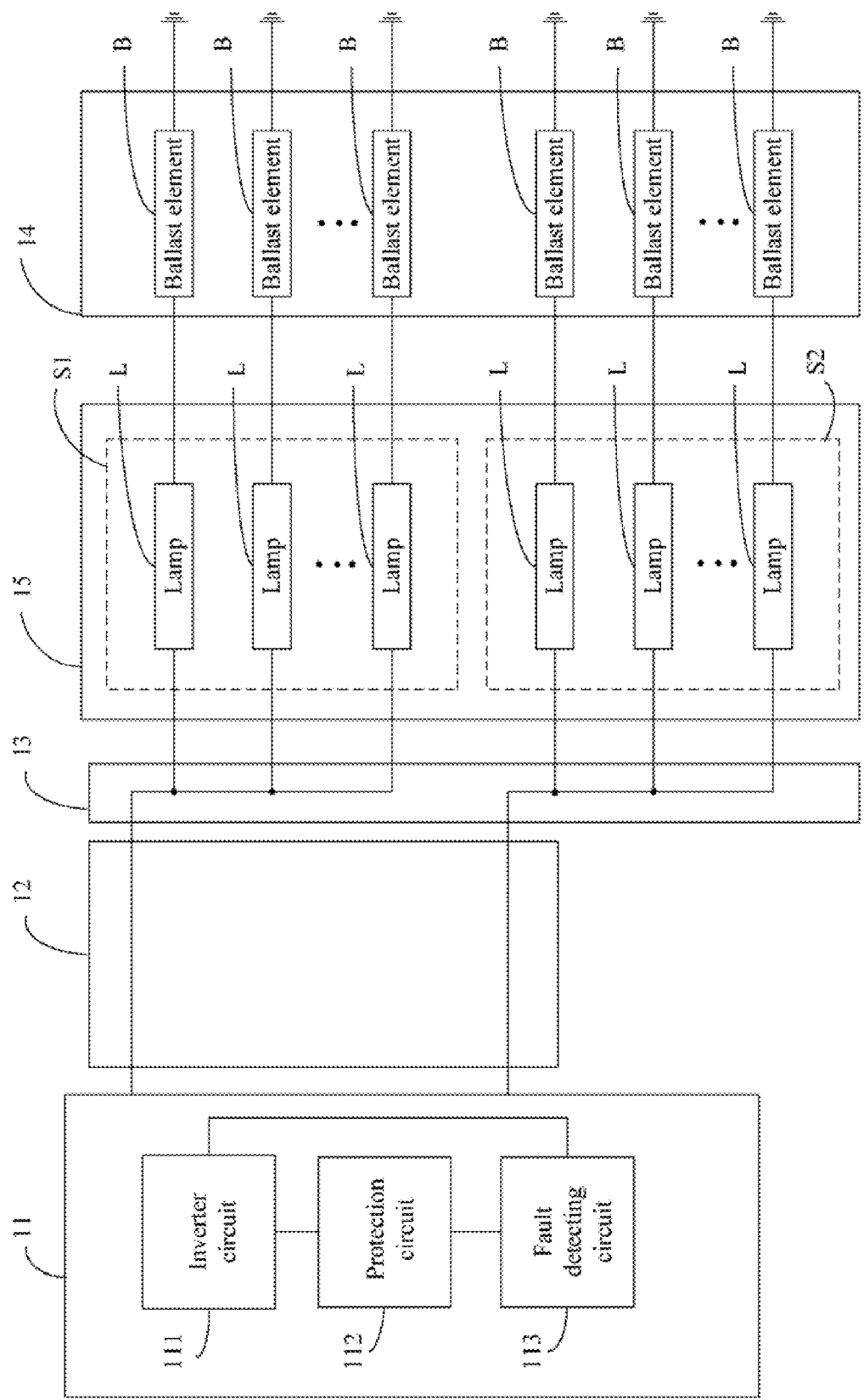
FIG. 2 is a block diagram showing a block diagram of another exemplary configuration of the system for driving a plurality of lamps.

Referring to FIG. 2, another exemplary embodiment of the backlight assembly 100A is illustrated. The configuration of the backlight assembly 100A, especially the connections between the splitter 13, the balance unit 14, and the lamps module 15, may be changed.

Aging, as well as faults occur in the lamps L may change overall electrical characteristic of the lamps module 15 and the backlight assembly 100. Minor affects of aging of the resistance of each lamp L is common among all lamps L, and may be disregarded by fault detection, which can be done, for example, by grouping lamps L into two or more sets, and comparing electrical characteristics associated with these sets.

The fault detecting circuit 113 may detect a condition of at least one of the lamps L by detecting signals generated from one or more transformers in the inverter circuit 111 before the signals are distributed by the splitter 13. That is, the signals may be extracted and detected by the fault detecting circuit 113 before being transmitted to the splitter 13. The splitter 13 may be made up of conductor, a bus, circuit, or any electronic component with its outputs more than inputs thereof.

The inverter circuit 111 may generate two driving signals to drive corresponding two sets of lamps L (such as sets S1 and S2 of FIG. 1). In an exemplary embodiment, the inverter circuit 111 may generate two driving signals (of same polarity or opposite polarity) and transmit these two driving signals respectively through a path 121 and a path 122 of the interface 12, and the splitter 13 to the lamps module 15. For example, the inverter circuit 111 generates two driving signals with the same polarity by synchronizing amplitudes and phases of these two driving signals at the same time t (t is a time variable). These two driving signals are of opposite polarity. For example, these two driving signals can be simultaneously generated by the inverter circuit 111 at time t with same amplitudes and opposite phases, thus providing opposite polarity. It should be noted that the two driving signals with same polarity or opposite polarity may include same or different amplitudes at the same time t. The two driving signals may be generated to respectively drive two sets of lamps L, such as sets S1 and S2, in the lamps module 15. One lamp L may vary in resistance when suffering a fault, and thus a change in the driving signal of the lamp L is generated.

The fault detecting circuit 113 is provided for detecting changes in the electric characteristics of the lamps L and report the abnormal condition or fault of the lamp L. Note that the number of lamps L in one set may be equal to or different from that in the other set. Lamps L in the lamps module 15 may be grouped in two or more sets for respectively receiving the driving signals.

Figure 3:
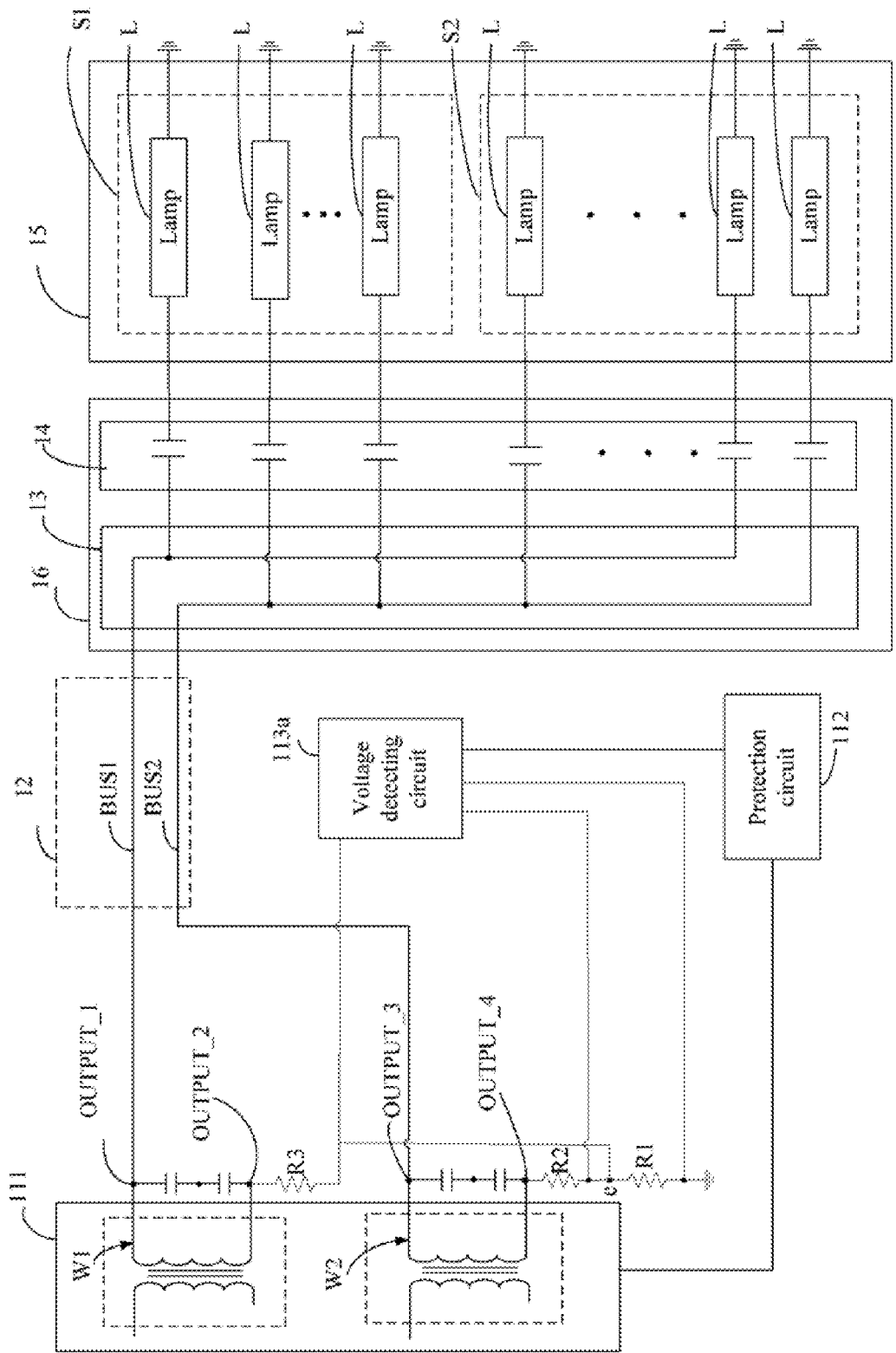
FIG. 3 is a block diagram showing a fault detecting circuit in FIG. 1.

Referring to FIG. 3, the inverter circuit 111 includes a first secondary winding W1 and a second secondary winding W2 of one or more transformers. The first secondary winding W1 includes a first high voltage end OUTPUT_1 and a first low voltage end OUTPUT_2. The second secondary winding W2 includes a second high voltage end OUTPUT_3 and a second low voltage end OUTPUT_4. The inverter circuit 111 outputs AC driving signals through the first and second high voltage ends OUTPUT_1 and OUTPUT_3 to respectively drive odd-numbered and even-numbered lamps L in the lamps module 15.

The fault detecting circuit 113 includes a voltage detecting circuit 113a, a first detecting resistor R1, a second detecting resistor R2, and a third detecting resistor R3. The first low voltage end OUTPUT_2 and the second low voltage end OUTPUT_4 are connected to each other via the second detecting resistor R2 and the third detecting resistor R3 which share a common node e. The node e is grounded via the first detecting resistor R1. The resistance of the second and third detecting resistor R2, R3 are governed by the relation: $r2*N_L1=r3*N_L2$, where r2 is the resistance of the second detecting resistor R2, r3 is the resistance of the third detecting resistor R3, $N_L1$ is the number of the lamps L connected to the first secondary winding W1, $N_L2$ is the number of the lamps L connected to the second secondary winding W2. The first detecting resistor R1, the second detecting resistor R2, and the third detecting resistor R3 are respectively connected to the voltage detecting circuit 113a. The voltage detecting circuit 113a is configured to detect the voltage variance of the first, second and third resistors R1, R2, R3.

In operation, when the lamps L operate normally, the current signal output from the first low voltage end OUTPUT_2 and the second low voltage end OUTPUT_4 counteract each other, such that the voltage across the first detecting resistor R1 is kept close to zero. When one or more lamps L in the different sets S1 or S2 fails, the output power of the first secondary winding W1 and second secondary winding W2 vary with the load, the current output from the first low voltage end OUTPUT_2 and the second low voltage end OUTPUT_4 do not counteract each other thus voltage occurs at the node e, and the voltage across the first detecting resistor R1 can be detected by the voltage detecting circuit 113a. The voltage detecting circuit 113a generates and transfers a control signal to the protection circuit 112 when the voltage across the first detecting resistor R1 is greater than a predetermined value.

It is possible that an equal number of faults may occur in each set S1, S2 and the current signals output from the first low voltage end OUTPUT_2 and the second low voltage end OUTPUT_4 counteract each other. However, the current flowing through the second detecting resistor R2 is only output from the first low voltage end OUTPUT_2 and the current flowing through the third detecting resistor R3 is only output from the second low voltage end OUTPUT_4. The voltage across the second detecting resistor R2 and the third detecting resistor R3 correspondingly vary with the number of faulty lamps L in the sets S1 and S2. Therefore, the voltage detecting circuit 113a can monitor the abnormality of the lamps L in the sets S1 or S2 by detecting changes in the voltage across the second detecting resistor R2 and the third detecting resistor R3.

The balance unit 14 is designed to prevent arcing. The balance unit 14 can be, for example, a capacitor (C) balance circuit, an inductor (L) balance circuit, or a Jin balance circuit. The balance unit 14 is a C-balance circuit. The capacitors in a C-balance circuit can be surface mounted device (SMD) capacitors, or dip capacitors. The splitter 13 and the balance unit 14 may be integrated into a printed circuit board (PCB) 16, as in this embodiment, and then it is not needed to have a surface mounted device (SMD) or dip device for protecting the backlight assembly 100 formed thereon.

Figure 4:
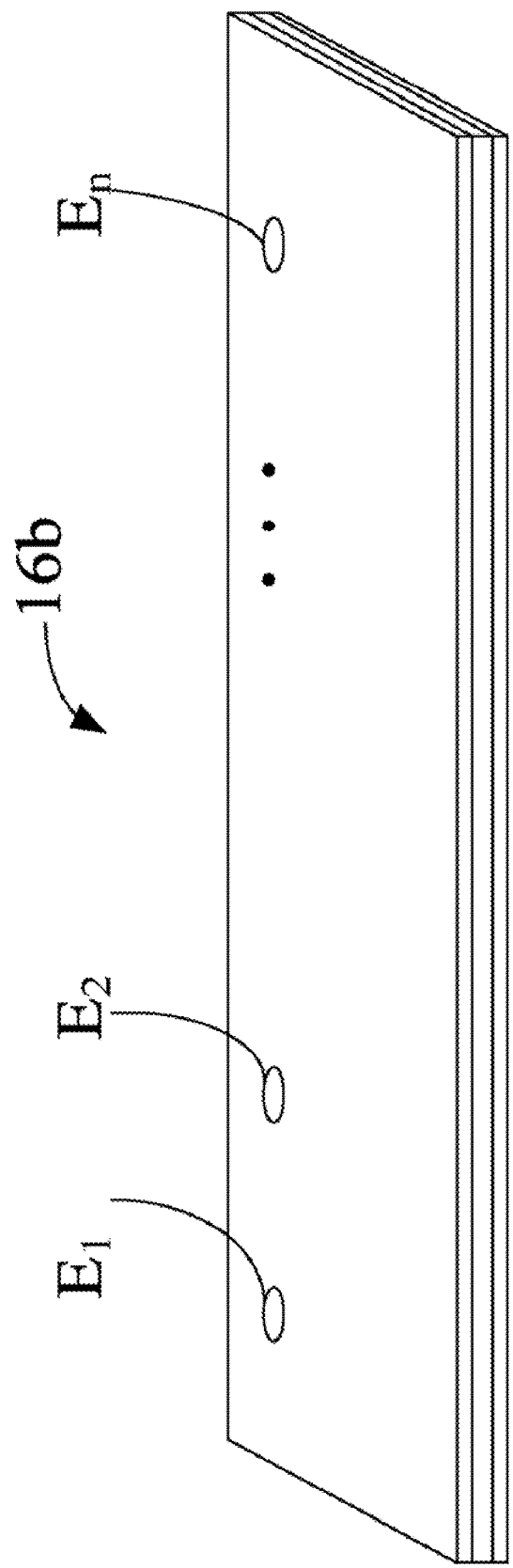
FIG. 4 is a schematic diagram showing an exemplary embodiment of a balancing circuit board.

Referring to FIG. 4, the balance unit 14 includes a multi-layered PCB 16b that has a number of capacitors and a number of vias E1, E2 . . . formed therein. Two electrodes of each capacitor are respectively formed in the PCB 16b and connected to one of vias E1, E2 . . . and En, each extending from the top surface to the bottom surface of the PCB 16b.

Figure 5A:
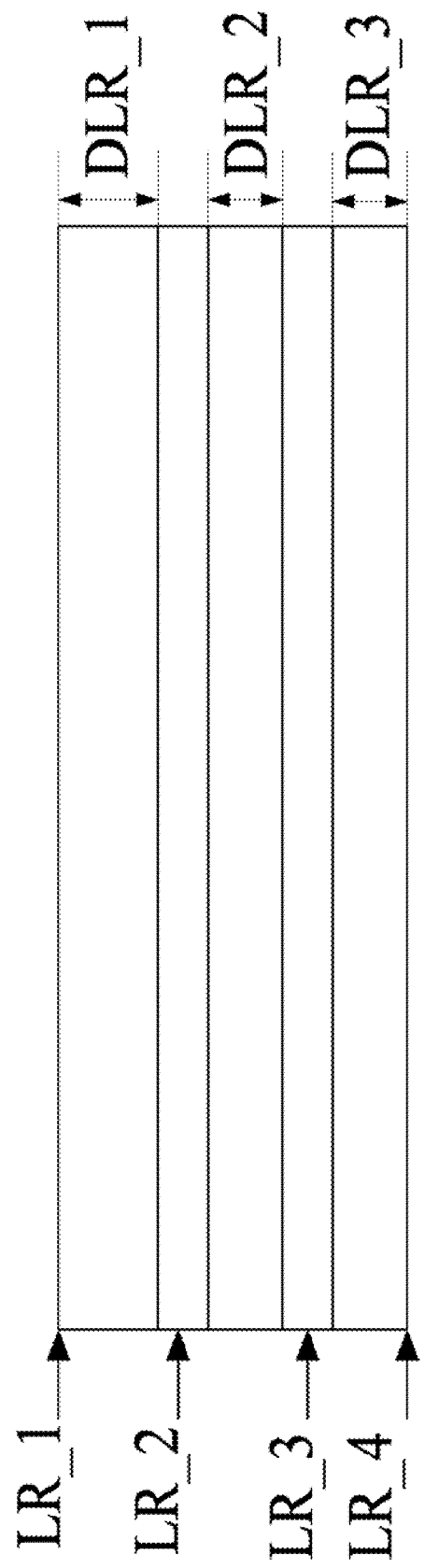
FIGS. 5A-5B are cross-sectional views of exemplary embodiments of a balancing circuit board.
Figure 5B:
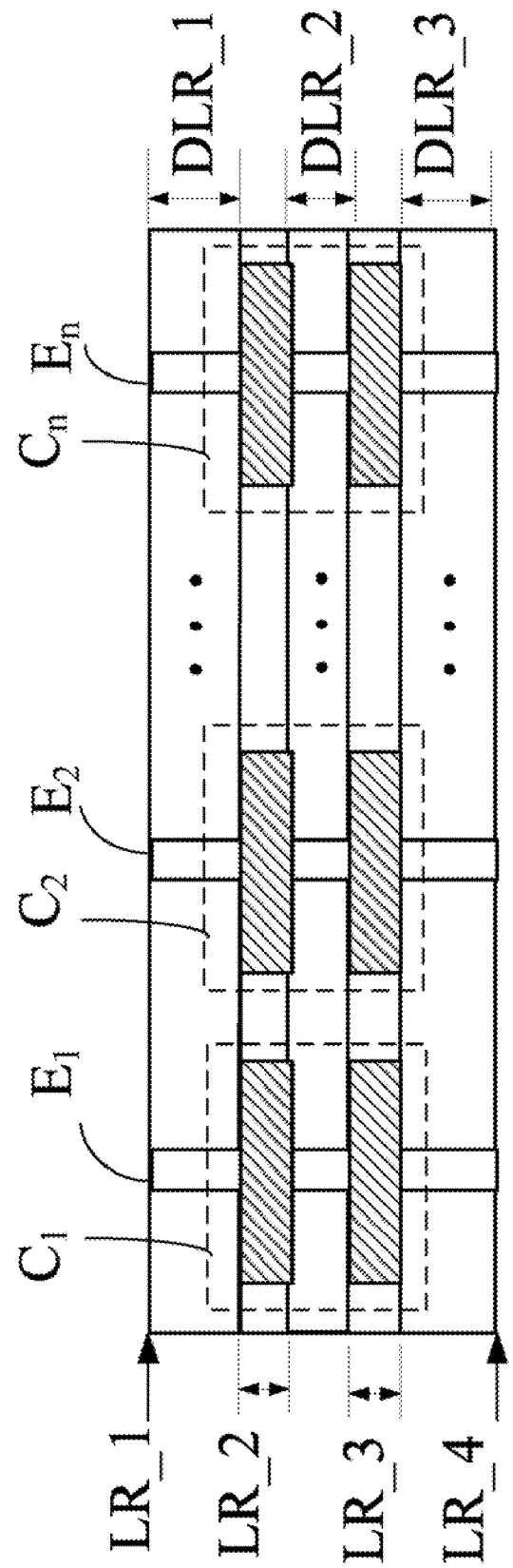

Referring to FIGS. 5A-5B, the PCB 16b includes four layers LR_1~LR_4 on which electrical conductive elements are formed. The layers LR_1~LR_4 are interlaced with dielectric layers DLR_1~DLR_3. Each of the capacitors includes two electrically conductive plates respectively formed on the second and third electrically conductive layers LR_2 and LR_3 of the PCB 16b for temporarily storing electrons. Two vertically adjacent plates in FIG. 5B respectively include two electrodes of a capacitor (such as C1). One electrode is connected to the via (such as E1), and the other is connected to a bus connected to the inverter circuit 111.

Referring to FIGS. 6A-6D, each of vias 191~198 and 191A~196A extends from the top outer surface of the layer LR_1 through LR_2, LR_3 to the outer surface of the layer LR_4 of the exemplary embodiment of the PCB 16b. Each via may be made up of electrically conductive material filling through-holes in the layers LR_1~LR_4. The vias 191~196 may be respectively strengthened by rivets extending through the through-holes. The buses 121 and 122 of the interface 12 may be respectively connected to via 197 and via 198. Each of vias 191-196 may be connected to a lamp L in the module 15. When signals conveyed by the buses 121 and 122 are of opposite polarity, any two neighboring vias respectively connected to the vias 197 and 198 may provide signals of opposite polarity to lamps L.

Figure 6A:
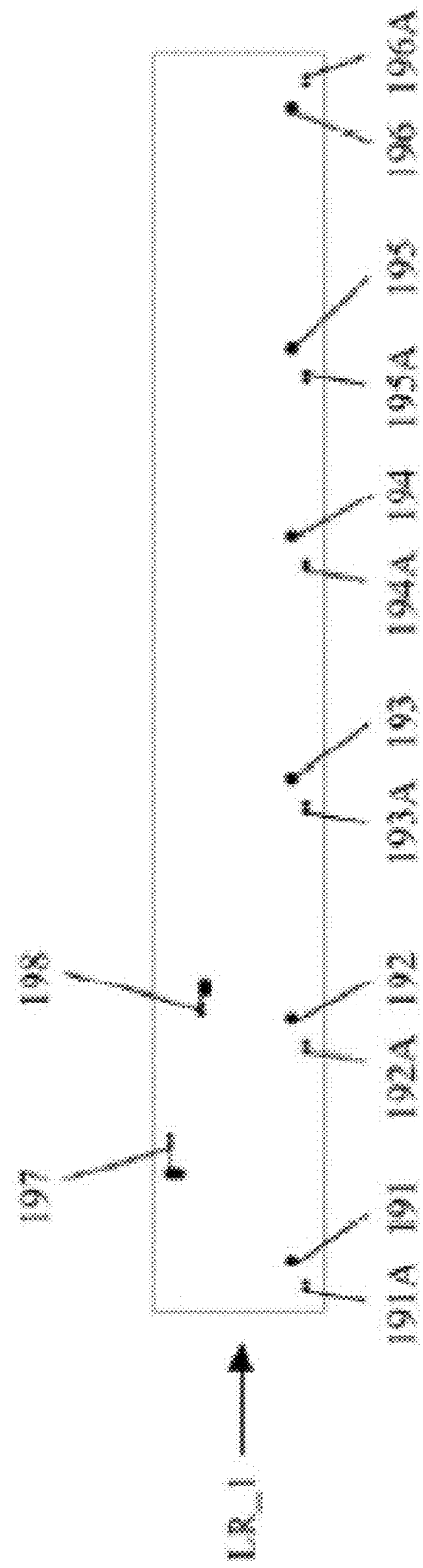
FIGS. 6A-6D are schematic diagrams showing respective layers in an exemplary embodiment of a balance unit.

In FIG. 6A, the top layer LR_1 of the exemplary embodiment of the PCB 16b may include no SMD or dip device other than connectors.

Figure 6B:
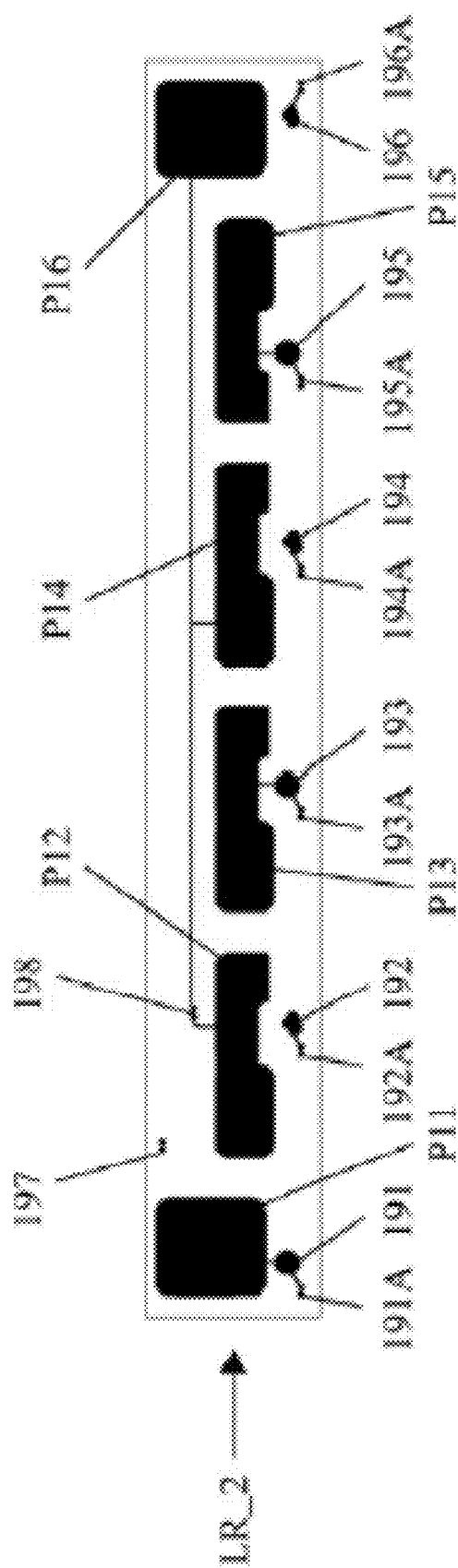

In FIG. 6B, the second layer LR_2 of the PCB 16b includes electrically conductive plates P11, P12, P13, P14, P15, and P16. The plates may include printed copper foils. As shown, each plate may include two areas connected to each other through a narrow trace. Plates P11, P13, and P15 are respectively connected to vias 191, 193, and 195 while plates P12, P14, and P16 are all connected to the via 198. The vias 191A~196A are redundant vias respectively connected to the vias 191-196.

Figure 6C:
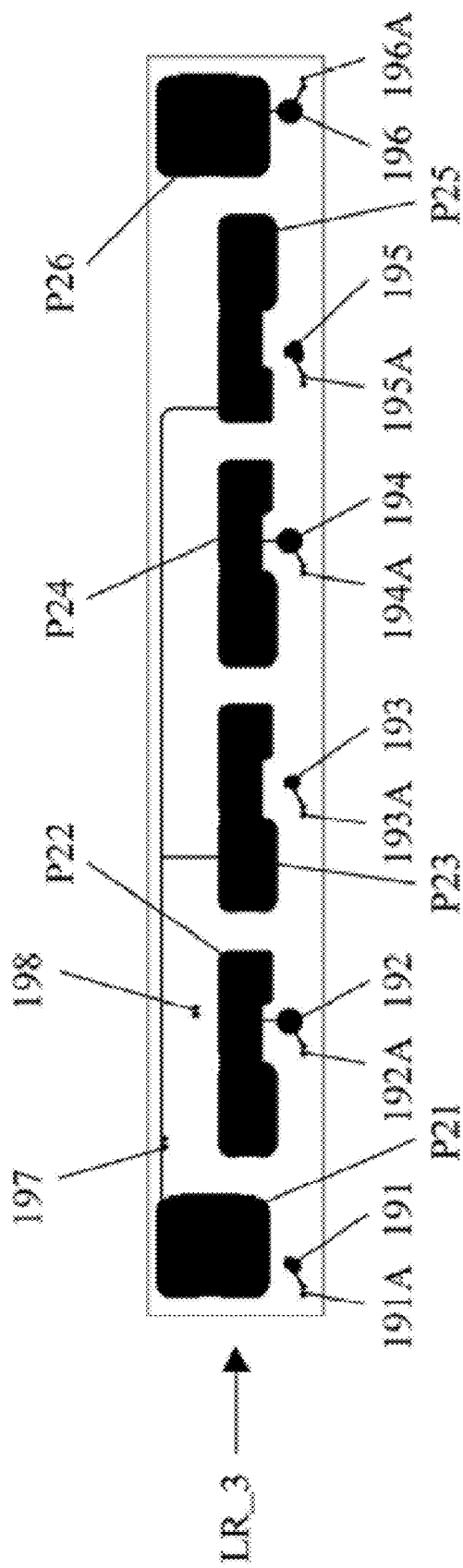
Figure 6D:
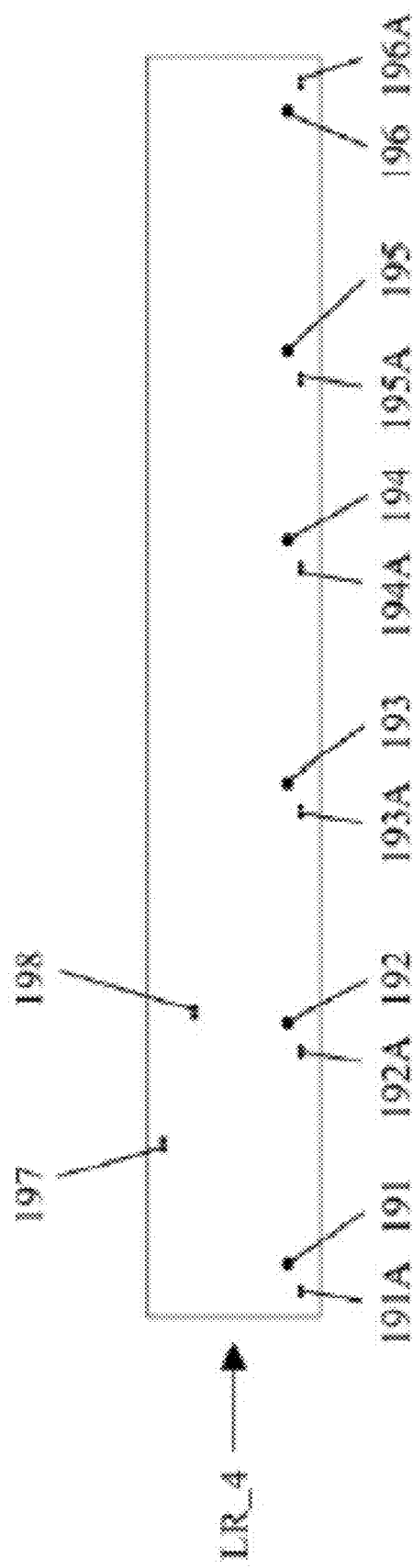

In FIG. 6C, the third layer LR_3 of the PCB 16b includes electrically conductive plates P21, P22, P23, P24, P25, and P26. The plates may include printed copper foils. Plates P21, P23, and P25 are all connected to the via 197 while plates P22, P24, and P26 are respectively connected to vias 192, 194, and 196. In FIG. 6D, the bottom layer LR_4 of the PCB 16b also includes no SMD or dip device.

Electrodes of different capacitors connected to the same bus may be located in different layers. Referring to FIGS. 7A-7D, another exemplary embodiment of the PCB 16b is illustrated. Each of the vias 201-209 and 201A-206A extends from the top outer surface of the layer LR_1 through LR_2, LR_3 to the outer surface of the layer LR_4 of the PCB 16b. Each via may be made up of electrically conductive material filling through-holes in the layers LR_1~LR_4. The vias 201~206 may be respectively strengthened by rivets extending through the through-holes. The buses 121 and 122 of the interface 12 may be respectively connected to the via 207 and the via 208. Each of vias 201-206 may be connected to a lamp L in the module 15. When signals conveyed by the buses 121 and 122 are of opposite polarity, any two neighboring vias respectively connected to the vias 207 and 208 may provide the signals of opposite polarity to lamps L.

Figure 7A:
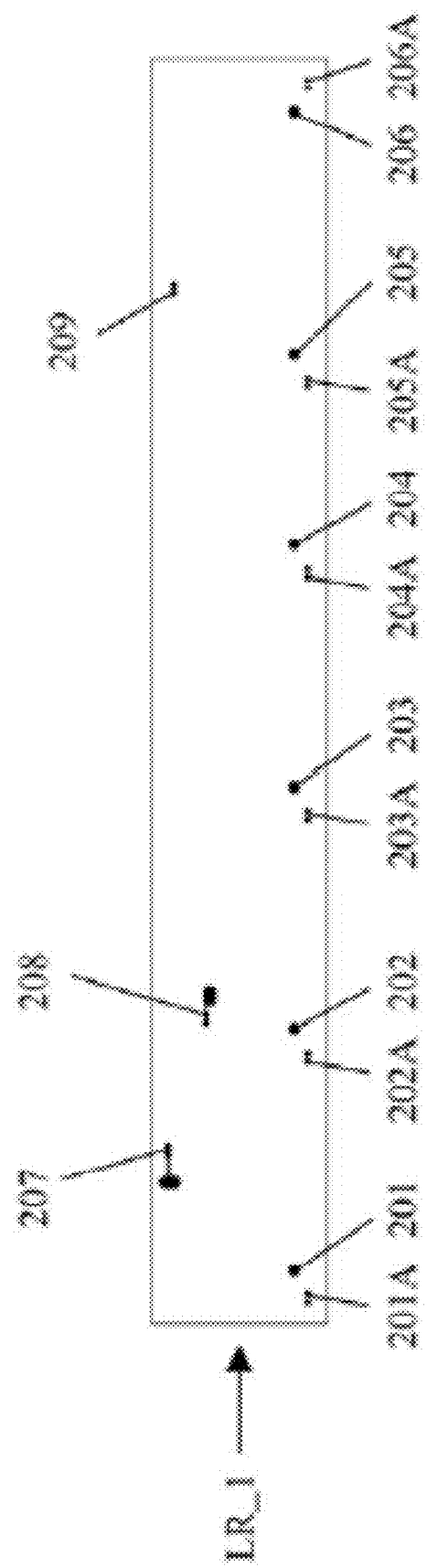
FIGS. 7A-7D are schematic diagrams showing respective layers in another exemplary embodiment of a balance unit.
Figure 7B:
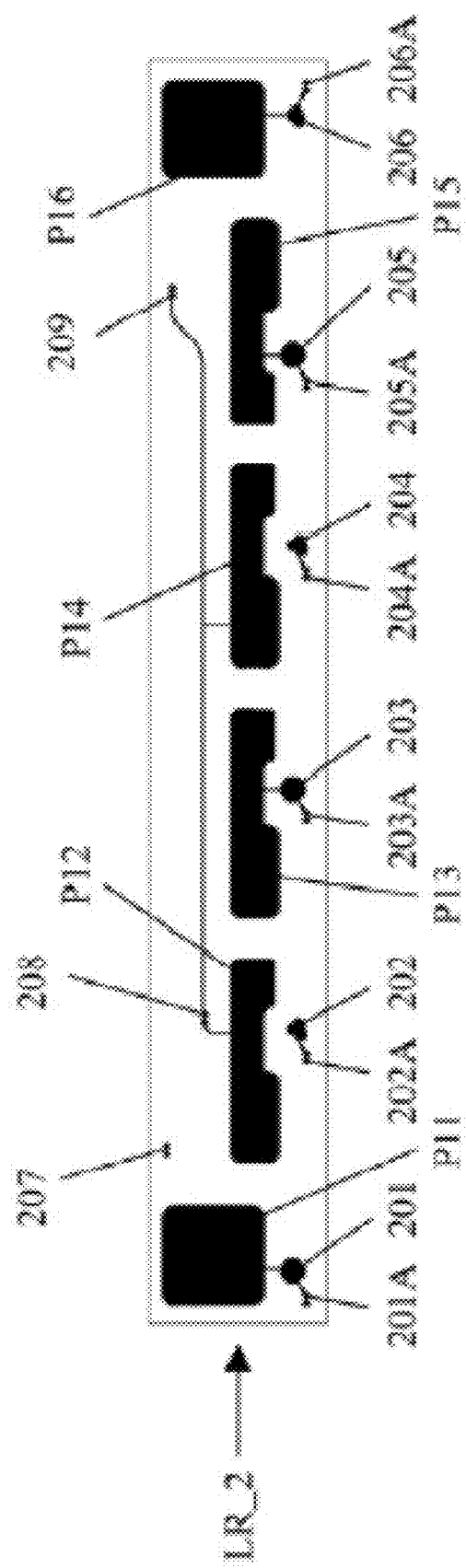

In FIG. 7A, the top layer LR_1 of the PCB 16b may include no SMD or dip device. In FIG. 7B, the second layer LR_2 of the PCB 16b includes electrically conductive plates P11, P12, P13, P14, P15, and P16. The plates may include printed copper foils. Plates P11, P13, P15, and P16 are respectively connected to vias 201, 203, 205, and 206 while plates P12 and P14 are connected to via 208 and via 209. The vias 201A-206A are redundant vias respectively connected to the vias 201-206.

Figure 7C:
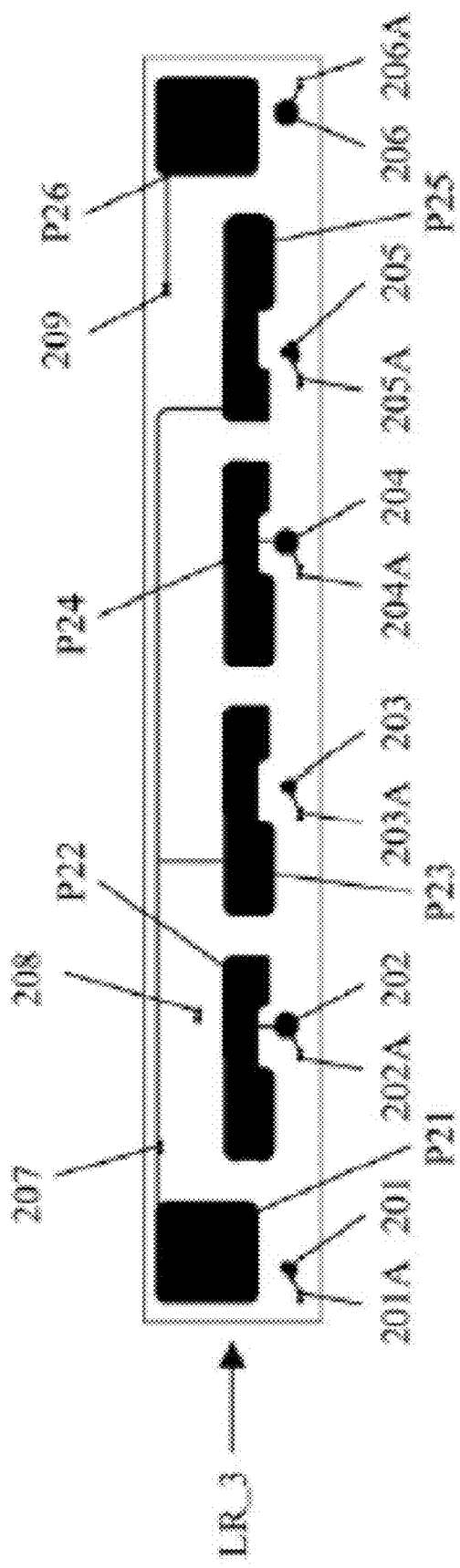
Figure 7D:
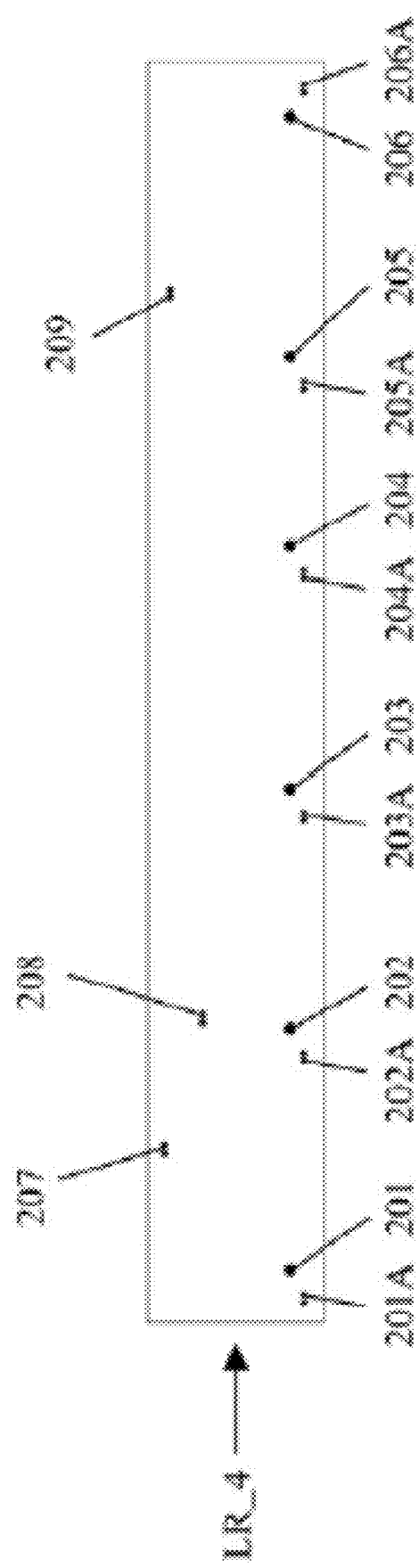

In FIG. 7C, the third layer LR_3 of the PCB 16b includes electrically conductive plates P21, P22, P23, P24, P25, and P26. The plates may include printed copper foils. Plates P21, P23, and P25 are all connected to via 207 while plates P22 and P24 are respectively connected to vias 202 and 204. Plate P26 is connected to via 209. In FIG. 7D, the bottom layer LR_4 of the PCB 16b also includes no SMD or dip device.

Figure 8:
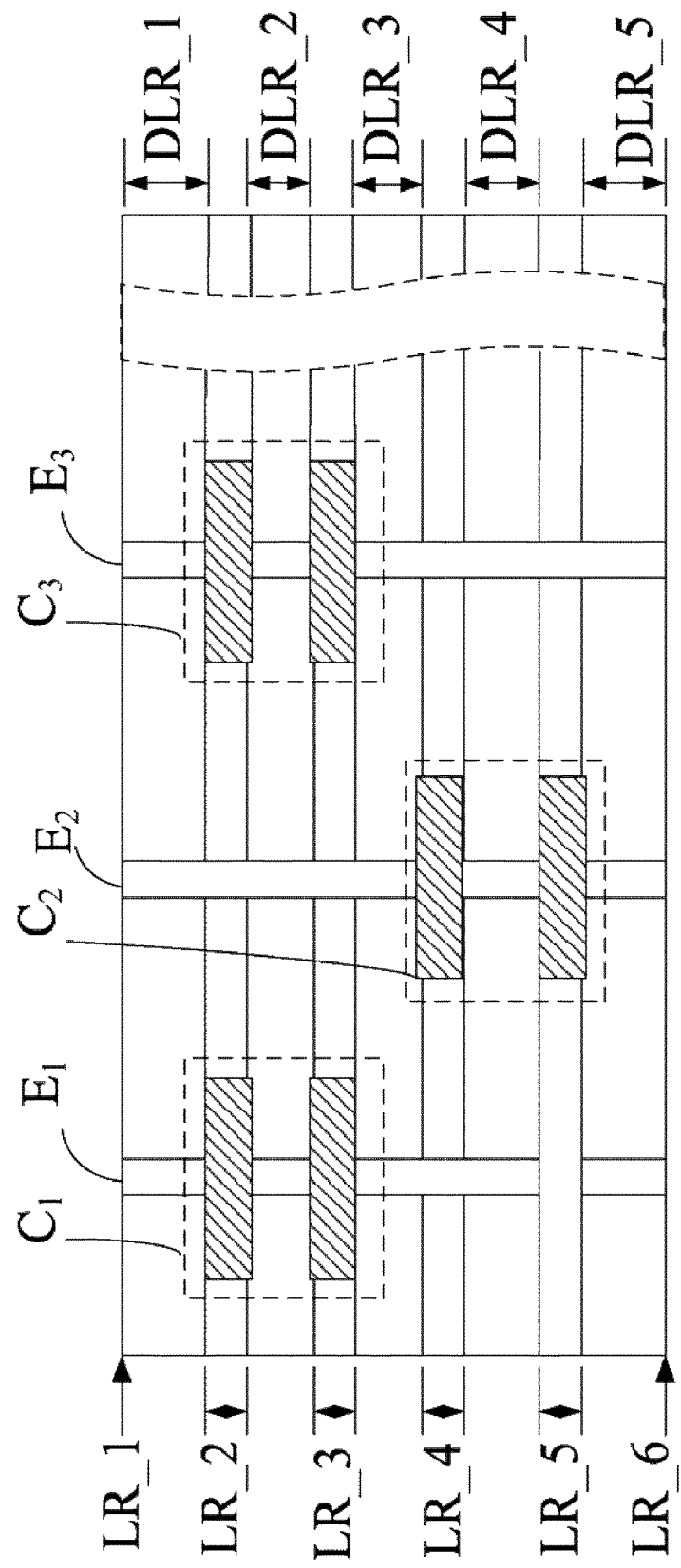
FIG. 8 is a block diagram showing an exemplary configuration of a balancing circuit board and a fault detecting circuit.

It is understood that the balance unit 14 is not limited to the PCB 16b with four electrically conductive layers. For example, FIG. 8 shows another exemplary embodiment of the balance unit 14 comprising capacitors C1, C2, C3 . . . and Cn. Electrodes of the capacitors are formed in layers LR_2~LR_5. Electrodes of two adjacent capacitors are formed in different layers.

The system for driving a plurality of lamps may monitor the faults of the lamps by detecting the voltage variance of the first, second and third detecting resistors connected to the low voltage ends of the first and second secondary winding for providing the power to the lamps.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A system for driving a plurality of lamps modules, comprising:
    an inverter circuit to provide power to a plurality of lamps of the lamps modules;
    an interface to convey the power to the plurality of the lamps;
    a splitter to receive the power provided by the inverter circuit through the interface and distribute the power to the plurality of lamps;
    a balance unit to balance current flowing through the lamps; and
    a fault detecting circuit to detect and report an abnormality condition of at least one of the lamps by detection of a current signal output from the inverter, wherein the inverter generates current as two driving signals to drive two sets of the lamps in the lamps module, the fault detecting circuit detects variance of the driving signals caused by a faulty lamp, to detect the abnormality condition of the lamps, the inverter comprises at least two transformers to provide power to two sets of the lamps, each transformer comprises a secondary winding, each transformer comprises a low voltage end, the low voltage ends of the different transformers are connected to each other at a node after correspondingly passing through a detecting resistor, the node is grounded via another detecting resistor, the fault detecting circuit comprises a voltage detecting circuit connecting to each detecting resistor for detecting the voltage variance of the detecting resistors.

2. The system as claimed in claim 1, wherein the balance unit comprises a plurality of capacitors formed in a multi-layered unified structure comprising a plurality of electrically conductive layers interfaced by dielectric substances, and the number of the electrically conductive layers is not less than four.

3. The system as claimed in claim 1, wherein the two driving signals are of opposite polarity.

4. The system as claimed in claim 2, wherein the splitter and the balance unit are integrated on a printed circuit board on which no surface mounted device or dip device is formed to protect the system.

5. The system as claimed in claim 1, wherein the products of the resistance of the detecting resistor connected to the different transformers and the number of the lamps in the corresponding sets are equal to each other.

6. The system as claimed in claim 2, wherein each of the capacitors comprises two electrically conductive plates as electrodes thereof, and electrodes of two adjacent capacitors are respectively formed on different electrically conductive layers of the multi-layered unified structure.

7. The system as claimed in claim 2, wherein each of the capacitors comprises two electrically conductive plates respectively formed on the second and third electrically conductive layers of the multi-layered unified structure.

* * * * *